Nov. 6, 1951  H. C. NOE  2,574,154
MACHINE FOR WINDING A SHEATH AROUND A CORE
Filed Oct. 25, 1948  9 Sheets-Sheet 1

INVENTOR.
HAROLD C. NOE
BY
Luther W Hawley
ATTORNEY

Nov. 6, 1951            H. C. NOE            2,574,154

MACHINE FOR WINDING A SHEATH AROUND A CORE

Filed Oct. 25, 1948            9 Sheets-Sheet 3

Fig. 3.

INVENTOR.
HAROLD C. NOE
BY
ATTORNEY

Nov. 6, 1951  H. C. NOE  2,574,154
MACHINE FOR WINDING A SHEATH AROUND A CORE
Filed Oct. 25, 1948  9 Sheets-Sheet 6

Fig. 8.

INVENTOR.
HAROLD C. NOE
BY
Luther W Hawley
ATTORNEY

Fig. 9.

INVENTOR.
HAROLD. C. NOE

Nov. 6, 1951     H. C. NOE     2,574,154
MACHINE FOR WINDING A SHEATH AROUND A CORE
Filed Oct. 25, 1948     9 Sheets-Sheet 8

INVENTOR.
HAROLD C. NOE
BY
ATTORNEY

Patented Nov. 6, 1951

2,574,154

UNITED STATES PATENT OFFICE 2,574,154

MACHINE FOR WINDING A SHEATH AROUND A CORE

Harold C. Noe, Upper Montclair, N. J., assignor to Joseph Dixon Crucible Company, Jersey City, N. J., a corporation of New Jersey Application October 25, 1948, Serial No. 56,383

11 Claims. (Cl. 93—81)

This invention relates to a method of and machine for winding a sheath around a core and particularly to the manufacture of pencils having a sheath of sheet material wound around a core of any desired material, such as graphite, commonly termed lead, rubber or other material.

One type of machine adapted for carrying out this operation is disclosed in Patent No. 2,259,959. This machine, although operative and practical, has certain disadvantages. For instance, in the patent referred to, the belt which effects the winding of the sheet around the core must be reversed after each winding operation is completed before another sheath can be formed. This is time consuming and slows down the production very materially, thus increasing the cost of the article. Moreover, the belt becomes worn from continued use of the same part of the length thereof.

This invention has for its salient object to provide a pencil sheath forming machine and method so constructed and arranged and so worked out that after the pencil has been formed and ejected, the method and machine can continue in operation without reversal of the sheath forming mechanism.

Another object of the invention is to provide a method and machine of the character described that are simple and practical, the machine comprising a minimum number of parts to accomplish the objects thereof and carry out the method.

Futher objects of the invention will appear from the following specification taken in connection with the drawings which form a part of this application, and in which.

The invention briefly described consists of a machine comprising means for feeding a sheet of paper a predetermined distance in which the advance end of the sheet will be positioned above an endless belt which travels through a tank of suitable adhesive and around four supporting rollers. Two of these rollers are positioned in the tank and one of these two rollers is vertically adjustable to provide tension or slack in the belt at a predetermined period in the operation of the machine. The upper two rollers around which the belt is led are relatively movable toward and away from each other, one roller being mounted on a fixed axis and the other roller being movable toward and away from the first roller during the operation of the machine. The sheet of paper is fed to a position in which the advance edge of the paper is above the belt, with the upper belt rollers in separated position. At this time in the cycle of operation the belt is stopped. When slack is provided in the belt, a pocket former moves downwardly on the upper surface of the paper above the belt to force the paper and belt downwardly between the two upper rollers which have been moved to separated position, to form a pocket in the belt. Thereupon a lead is dropped into the pocket on the upper surface of the advance end of the paper sheet. The two upper rollers are then moved toward each other, the lower movable roller being moved downwardly to take up the slack, the belt is again started in motion, and the paper sheet is then rolled tightly around the lead core by the motion of the belt. The belt is held in engagement with the two upper rollers by means of idler rollers which are spring actuated toward each other and against the outer surface of the belt and the outer peripheries of the rollers.

After the paper sheet has been thus wound around the core to form a sheath, the upper rollers are separated and the motion of the belt will cause the pencil so formed to be discharged into a guideway, whereupon it is engaged by an ejector and discharged from the machine.

Further details of the invention will appear from the following description.

The machine embodying the invention comprises a plurality of operating mechanisms which may, for convenience in describing the invention, be divided up into paper feed mechanism, lead or core feed or discharge mechanism, belt operation and control, pocket forming mechanism, and ejector mechanism.

*Paper feed mechanism*

This mechanism is shown more particularly in Figs. 1, 2, 4, 5 and 10. The machine comprises a main frame consisting of a base 20, side frame members 21 and 22, and cross frame members 23 and 24. The main frame houses the operating control and driving connections for the pencil forming mechanism, which is mounted in a second frame or casing connected to the side frame member 22 of the main frame and extending therebeyond, as shown particularly in Fig. 2.

Figure 1:
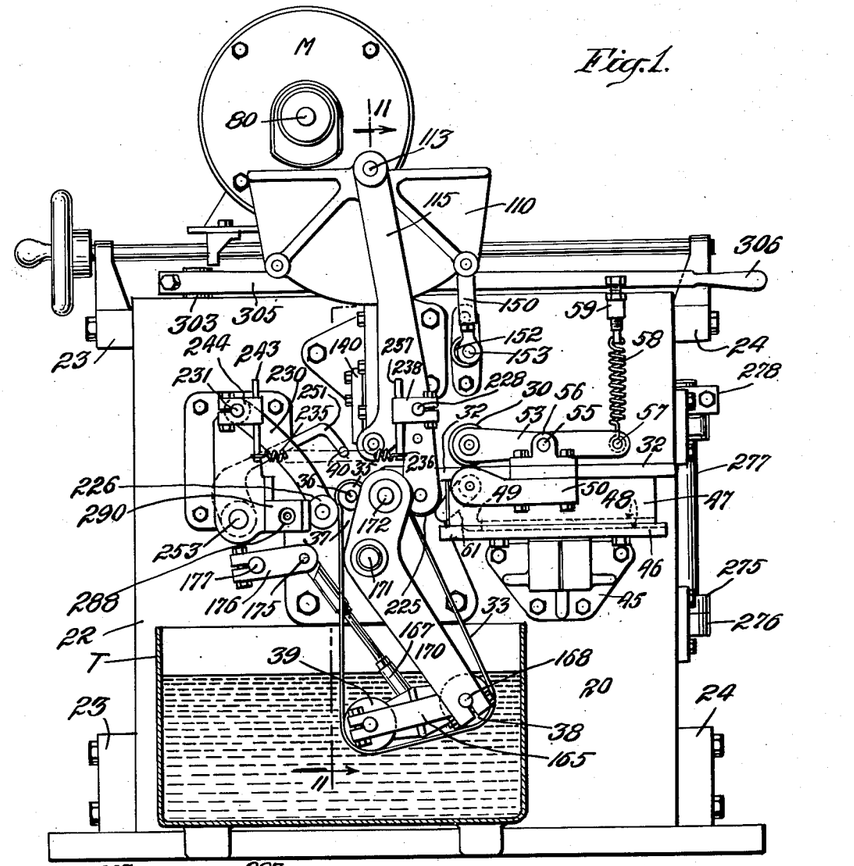
Fig. 1 is an elevational view, partly in section, of the pencil forming mechanism.
Figure 4:
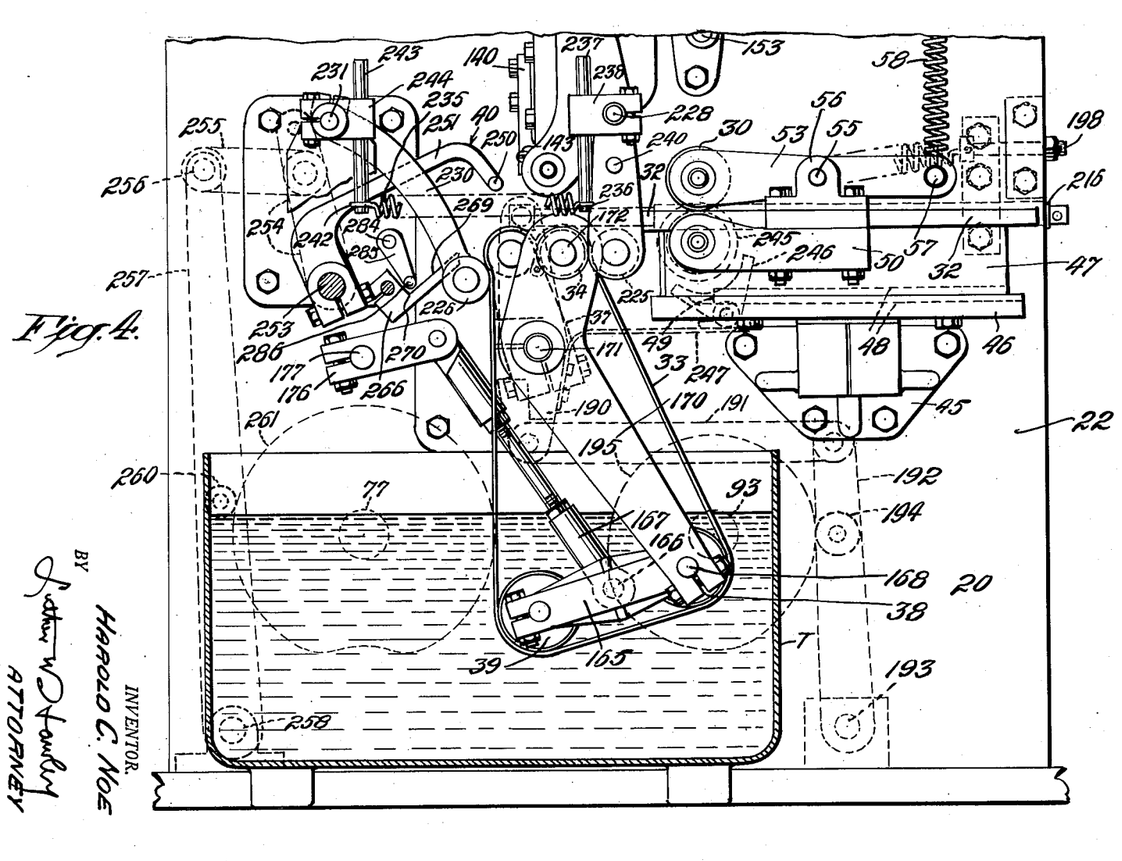
Fig. 4 is an enlarged sectional elevation showing the pencil forming mechanism and the control cams for the pocket former and for the movable belt roller hereinafter described.
Figure 8:
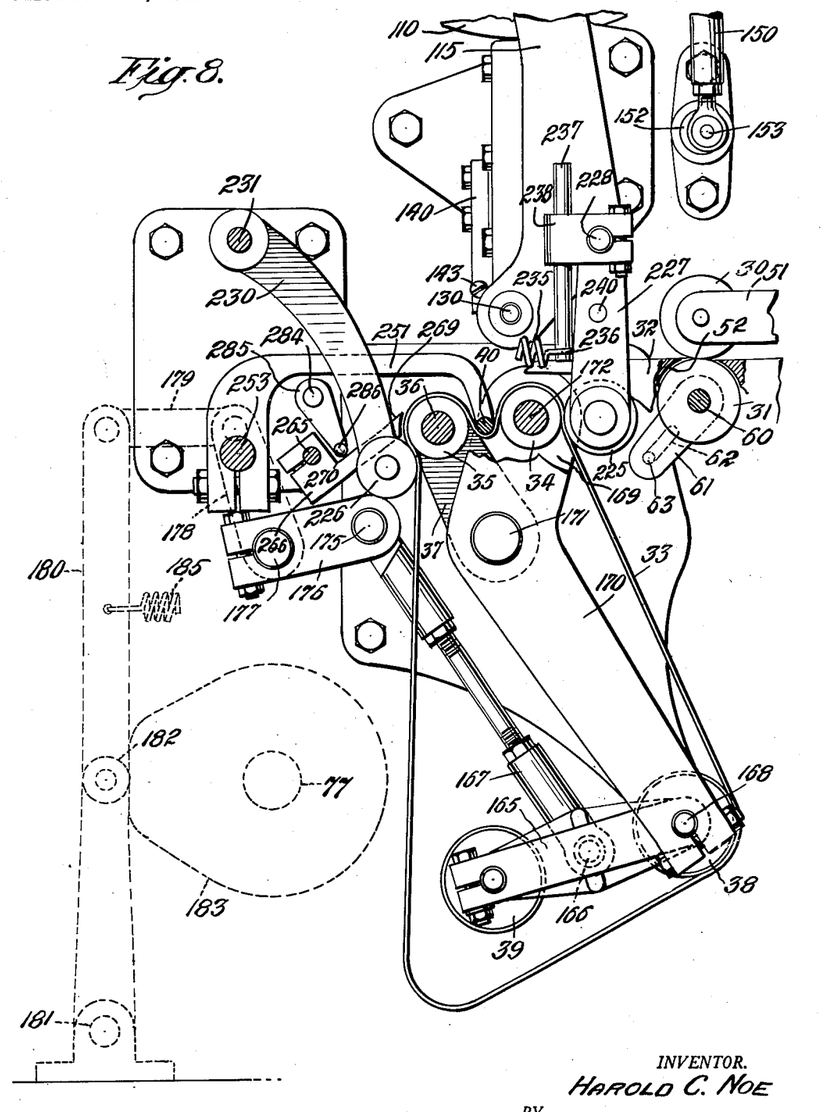
Fig. 8 is an enlarged elevational view showing the pocket former in operation forming a pocket in the belt which operates to roll the paper around the lead core.

Before describing in more detail the paper feed, the operative parts of the pencil sheath forming mechanism may be briefly described, reference being had particularly to Figs. 1, 4 and 8. The sheet of paper is fed between a pair of paper feed rolls 30 and 31, the roll 31 being driven in a manter hereinafter described. The paper is fed along a platform 32 to the position shown in Fig. 5 above an endless belt 33 which extends around a pair of rollers 34 and 35, the roller 34 being mounted on a fixed axis and being positively driven in the manner hereinafter described, and the roller 35, also positively driven, being mounted on a shaft 36 which is carried by an arm 37 and being movable toward and away from the roller 34 in a manner hereinafter set forth. The belt 33 also extends around a pair of idler rollers 38 and 39, the roller 39 being movable about the axis of the roller 38 to provide slack in the belt to permit the belt to be pushed downwardly between the rollers 34 and 35 by a pocket former 40.

Figures 5, 6, 7:
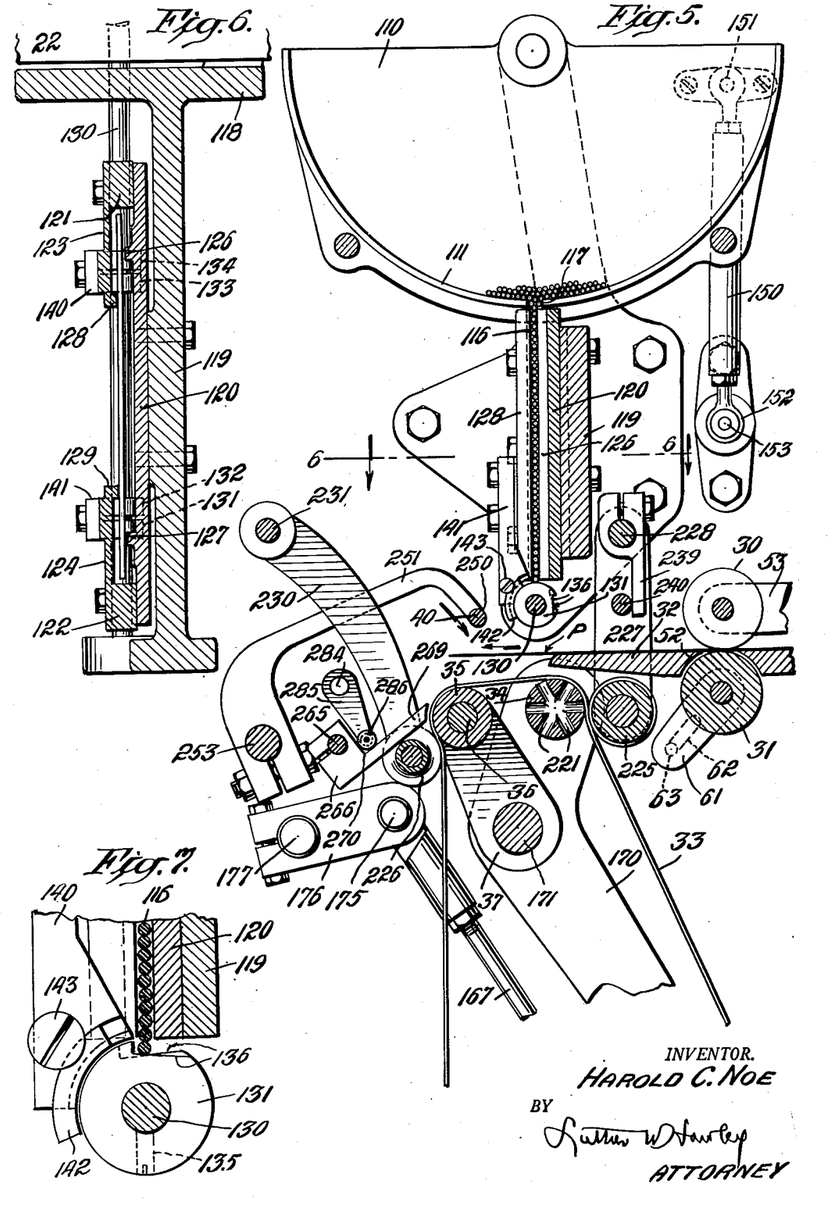
Fig. 5 is a vertical sectional elevation through the lead or core feeding mechanism, paper feed rolls, belt rollers, and pocket former.
Fig. 6 is an enlarged sectional elevation taken substantially on line 6—6 of Fig. 5, looking in the direction of the arrows.
Fig. 7 is an enlarged vertical sectional elevation of the lower end of the lead discharge chute and of the lead feeding mechanism which feeds the leads.

The pocket former 40 comes into operation when the rollers 34 and 35 are separated, as shown in Fig. 5, and engages the paper sheet P, forcing the sheet against the belt 33 and downwardly to form a pocket. After the pocket has been formed, the pocket former is retracted, a lead core is dropped into the pocket, the roller 35 moves toward the roller 34 to the position shown in Figs. 4 and 7, and the travel of the belt will then roll the paper around the lead into a convolute sheath.

Figure 2:
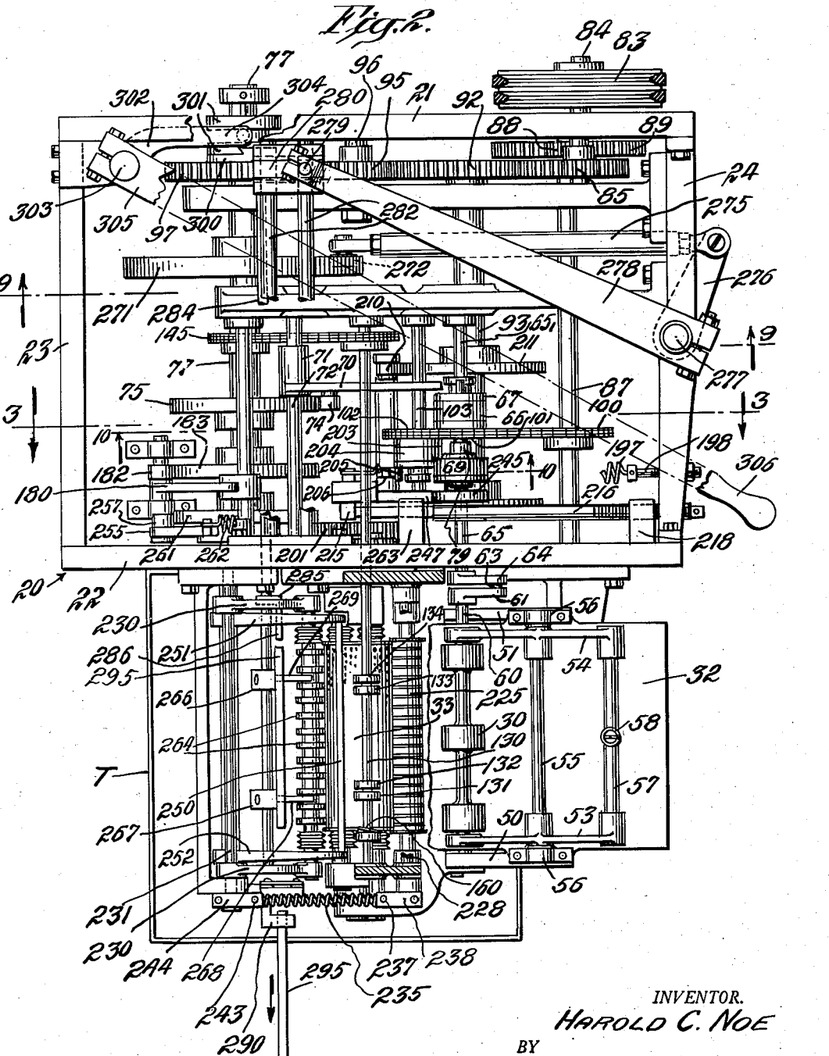
Fig. 2 is a top plan view of the machine, parts being omitted for the sake of clearness and other parts being broken away, this view showing in plan the pencil forming mechanism and the driving connections therefor.

The paper is fed to the position shown in Fig. 5 by the feed rolls 30 and 31 and along the platform 32 in the following manner. This mechanism is supported on a bracket 45 which is mounted on the side 22 of the main frame. On the bracket 45 there is secured a base 46 and on the base 46 there is adjustably mounted an upright frame 47. The upper surface of the base has a longitudinal guideway 48 into which projects a downwardly extending bar 49 carried by the frame 47. On the upper end of the frame 47 is mounted the platform 32. The lower feed roller 31 is mounted in brackets 50 and 51 and this roller extends upwardly through an opening 52 in the platform 32. The upper feed roller 30, which may, if desired, be sectional, as shown in Fig. 2, is carried by arms 53 and 54 which are pivoted on a spindle 55 carried by bearings 56 supported on the platform 32. The arms 53 and 54 extend rearwardly from the spindle 55, the rear ends of the arms being connected by a rod 57. The central portion of the rod 57 is engaged by a spring 58, the other end of which is fixedly and adjustably secured to the frame, as shown at 59.

The adjustable mounting of the platform 32 and the feed rollers 30 and 31 is important since it is essential that the paper be fed thereby in a manner hereinafter described to the correct position above the belt 33 so that the paper will be pushed downwardly by the pocket former 40 into the pocket formed by the pocket former in the belt 33 and that the end of the paper will be correctly positioned to receive the lead core and to be wound around the core when the upper belt supporting and feeding rollers 34 and 35 have been moved toward each other to the position shown in Fig. 5. Unless the paper is correctly positioned it will not be wound around the core but may be fed upwardly out of the pocket by the travel of the belt.

Any desired sheet feeding mechanism may be used to feed the sheets to the feed rollers 30 and 31, such mechanism being old and common on printing presses and other machines of this character. The driving connections for the roller 31 will now be described.

Figure 10:
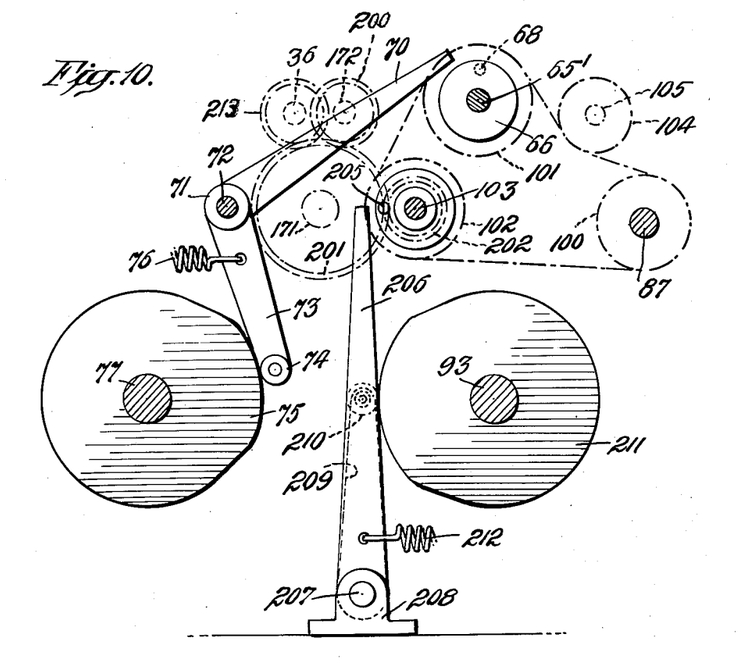
Fig. 10 is a vertical sectional elevation taken substantially on line 10—10 of Fig. 2, looking in the direction of the arrows, and illustrating the cam controls for the paper feed roller and belt roller drive.

As shown in Fig. 8, the paper feed roller 31 is mounted on a shaft 60 and on one end of the shaft 60 is secured a crank arm 61 having a slot 62 therein. The slot 62 receives a pin 63 which is carried by a crank arm 64 mounted on a shaft 65. Shaft 65 extends through the side wall 22 of the main frame and has mounted thereon one part or the outer part 69 of an over-running clutch. The other or inner part 79 of the said clutch is connected to shaft 65' alined with shaft 65. Shaft 65 and clutch part 69 can rotate independently of shaft 65' when shaft 65' is disconnected from its drive shaft by a clutch commercially known as a single revolution clutch, the two parts of this clutch being shown at 66 and 67 in Fig. 2. The control mechanism for this clutch is shown in Fig. 10. One part of the clutch has projecting therefrom a pin 68, and the clutch is so constructed that when the pin 68 is engaged by a stop, the clutch will be thrown out and the driving connection to the shafts 65' and 65 will be interrupted. The pin 68 is controlled by an arm 70 carried by a sleeve 71 rotatably mounted on a shaft 72. The sleeve 71 also has projecting downwardly therefrom, an arm 73 which carries a roller 74 held in engagement with the periphery of a cam 75 by a spring 76. Cam 75 is mounted on a shaft 77.

Figure 9:
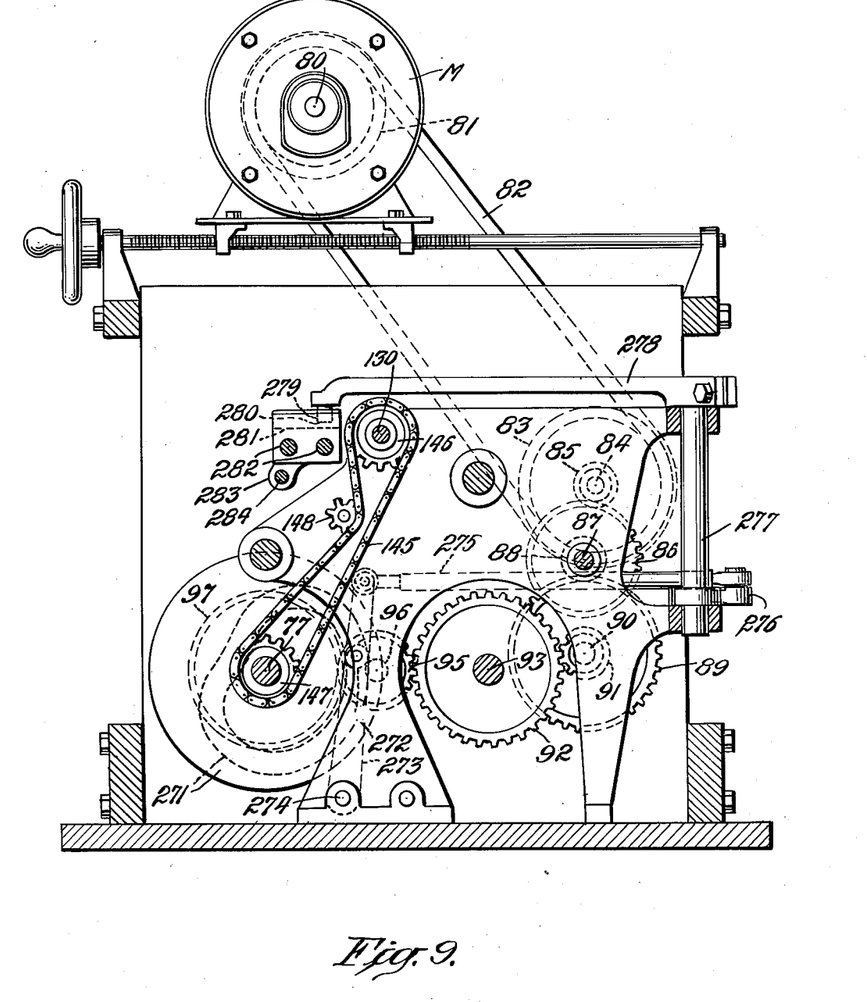
Fig. 9 is a vertical sectional elevation taken substantially on line 9—9 of Fig. 2, looking in the direction of the arrows, and illustrating the driving connections for control cams, ejector mechanism, etc.

The driving connections for the shaft 77 are shown particularly in Fig. 9. In this figure there is shown a motor M which is mounted on the top of the main frame of the machine and has a shaft 80 which carries a sheave 81 connected by a belt 82 to a sheave 83 mounted on a shaft 84. Shaft 84 has also secured thereto a gear 85 which meshes with a gear 86 mounted on a shaft 87. Shaft 87 also has secured thereto a gear 88 which meshes with a gear 89 carried by a shaft 90. Shaft 90 has also secured thereto a gear 91 which meshes with a gear 92 mounted on a shaft 93. This gear 92 meshes with an idler gear 95 mounted on a shaft 96. The gear 95 also meshes with a gear 97 which is mounted on the shaft 77 and is connected to the shaft 77 through a manually controlled clutch hereinafter described. Through these driving connections the cam 75 is rotated and periodically causes the arm 70 to be interposed in the path of rotation of the pin 68 of the one revolution clutch, thus causing the clutch to be thrown out and the drive to the feed roll to be interrupted after the paper has been fed to the proper position above the belt, as shown in Fig. 5.

Figure 3:
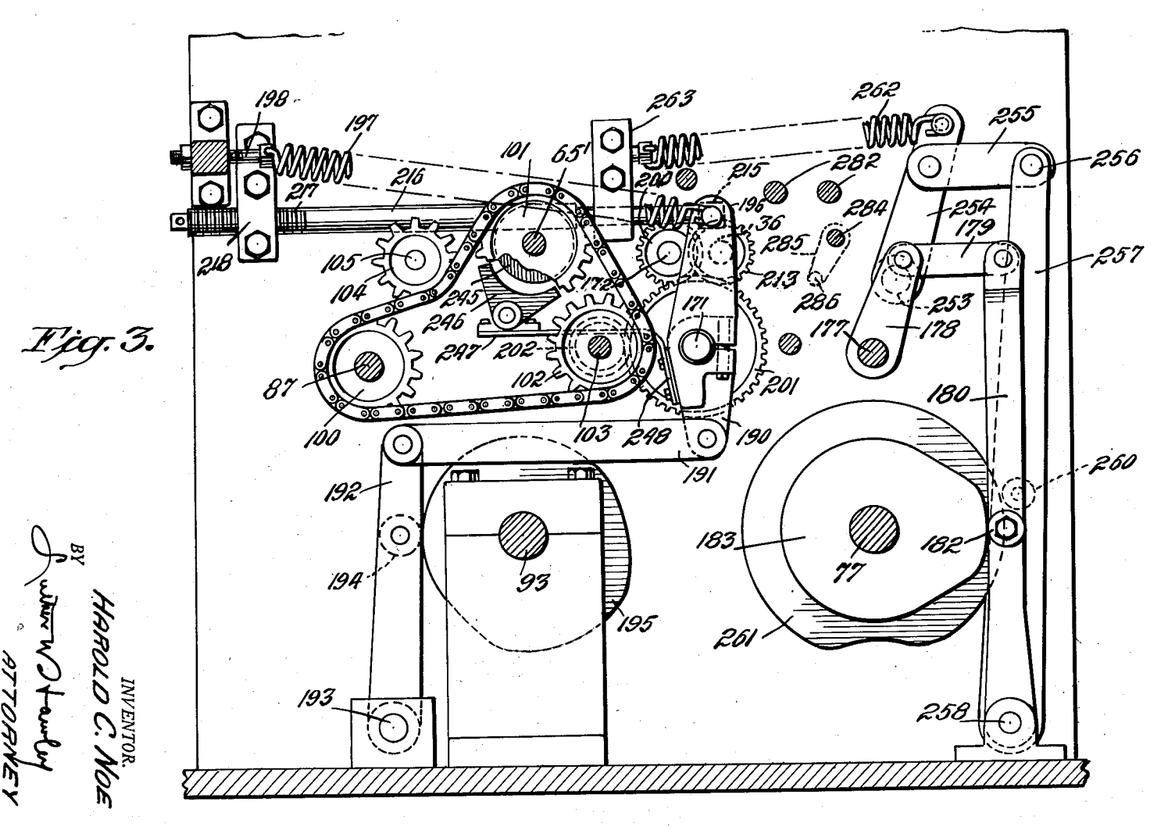
Fig. 3 is an enlarged sectional elevation through the driving connections, this view being taken substantially on line 3—3 of Fig. 2, looking in the direction of the arrows.

The shaft 65 which drives the paper feed roller 31 through the crank connection 64, 63 is driven by the clutch 66, 67 and over-running clutch 69, 79 and the clutch 66, 67 in turn is driven in the manner shown particularly in Figs. 3 and 10. In the foregoing description, the drive for the shaft 87, as illustrated in Fig. 9, has been described. The clutch 66, 67 is driven from the shaft 87 by means of a sprocket and chain driving connection. Shaft 87 carries a sprocket 100 which drives a chain 100' which extends around and meshes with a sprocket 101 on the shaft 65', this sprocket being connected to the clutch 66, 67. The chain 100' also extends around a sprocket wheel 102 mounted on a shaft 103. An idler sprocket 104 mounted on an idler shaft 105 holds the sprocket chain in driving engagement with the sprockets 100 and 101.

By means of the sprocket and chain driving connection just described, the portion 66 of the clutch is driven continuously and the other portion 67 of the clutch which is connected to the shaft 65' is driven intermittently, the clutch being cam controlled in the manner hereinbefore described. The over-running clutch is positively driven from shaft 65', in a direction to feed the paper, when the one revolution clutch 66, 67 is connected, but allows the paper to be pulled out freely by the wrapping belt.

*Lead feeding mechanism*

The lead cores for the pencils are mounted in a hopper 110 which has an arcuate bottom 111 and is mounted to oscillate on trunnions 112 and 113 carried by the upper ends of frame members or pedestals 114 and 115 supported above the paper feeding mechanism and belt hereinbefore described. These frame members are mounted on the side wall 22 of the main frame.

The hopper 110 is mounted above a lead guideway or discharge chute 116 and the bottom 111 of the hopper has an opening 117 through which the leads are discharged from the hopper into the chute.

The lead guideway or chute is constructed in the manner illustrated particularly in Figs. 5 and 6. A plate 118 is bolted to the frame member 22 and has a laterally extending plate 119 formed thereon, the plate 119 extending beneath the hopper. The lead guideway is formed between a member 120, which is bolted to the plate 119, and bars 121 and 122 which are secured to the edge portions of the member 120 and have flanges 123 and 124 extending inwardly from the members 121 and 122. The leads are guided between lugs or ribs 126 and 127 formed on the member 120 and lugs 128 and 129 formed on the inner ends of the flanges 123 and 124.

A shaft 130 is rotatably mounted in the lower ends of the pedestals 114 and 115, this shaft extending beneath the outlet end of the lead discharge chute. There are mounted on the shaft 130, four collars 131, 132, 133 and 134, and these collars are rotatably adjustable on the shaft 130, being held in adjustment by set screws 135. The collars 131 to 134 inclusive are notched, as shown at 136, and the collars can be adjusted so that the notches of all of the collars are disposed in alinement or they can be so adjusted that the notches will be disposed out of alinement so that some of the notches will be out of register with the notches in the other collars. The purpose of this construction is to accommodate the lead feeding collars to leads of slightly different diameters. In other words, with large leads the collars will be adjusted with the notches alined. However, with slightly smaller leads the notches can be thrown out of alinement so that the composite seats for the leads formed in the collars will be shallower than the seats formed when the notches are all in alinement.

In order to hold the leads in the notches in the feed collars until they are disposed above the pocket into which they are to be deposited, a pair of bars 140 and 141 are secured to the flanges 123 and 124, these bars having on their lower ends arcuate guiding and retaining members 142. The members 142 can be adjusted on an arc by means of a screw 143, so that the lower ends of the members 142 will be properly positioned to retain the leads on the collars until they have reached the proper location for discharge into the pockets.

The shaft 130 is driven from the shaft 77 by means of a chain 145 which drives a sprocket 146 on the shaft 130 and is driven by a sprocket 147 on the shaft 77. An idler sprocket 148 maintains the chain in proper driving relation to the sprockets 146 and 147. (See Fig. 9.)

The hopper is oscillated by means of a pitman 150 which is longitudinally adjustable as to length and is pivoted at 151 to the hopper. The lower end of the pitman is mounted on an eccentric 152 carried by a shaft 153, which is driven by a sprocket 154 and chain 155 from a sprocket 156 mounted on a shaft driven by suitable driving connections. In order to properly position the leads longitudinally as they are discharged, a spiral strip 160 is mounted on a collar 161 secured to the shaft 130 adjacent one end thereof. The spiral strip 160 encircles the shaft and the end 162 of the spiral strip positions the end of the lead.

*Belt operation and control mechanism*

As hereinbefore stated, the belt 33 is mounted on two pairs of rollers, namely, rollers 34 and 35, which engage and drive the belt and are positioned at the upper end of the belt and rollers 38 and 39 which are positioned at the lower end of the belt. The rollers 38 and 39 are mounted at the ends of a bar 165 which is pivoted at 166 intermediate its ends to the lower end of a link 167, this link being so constructed, as shown in Fig. 8, that it can be longitudinally adjusted as to length. One end of the bar 165 is pivoted on the axis of the roller 38, as shown at 168, to the lower ends of arms 169 and 170, which are fixedly mounted on a rod 171. The arms 169 and 170 extend upwardly beyond the rod 171 and in the upper ends of these arms is mounted a shaft 172 of the roller 34.

The link 167 is controlled in the following manner to swing the bar 165 about its pivot 168 so as to provide the necessary slack in the belt when the pocket former is about to move downwardly and form a pocket therein, as shown in Fig. 8. This is accomplished in the following manner. The upper end of the link 167 is pivoted at 175 to an arm 176 which is fixed to a shaft 177. This shaft also has secured thereto an arm 178, the upper end of which is connected by a link 179 to the upper end of a link 180, the lower end of the link 180 being mounted on a fixed pivot 181. Intermediate the ends of the link 180 is mounted a roller 182 which engages the outer periphery of a cam 183 mounted on the shaft 77. A spring 185 engages the arm 180 and holds the roller 182 in engagement with the cam 183.

As hereinbefore described, the roller 34 is mounted on a fixed axis, and the roller 35 is adjustable toward and away from the roller 34, being mounted on arms 37. This adjustment is accomplished in the manner particularly illustrated in Figs. 3 and 4. The arms 37 are fixed to the shaft 171 and there is also fixed to the shaft an arm 190 which is connected by a link 191 to the upper end of the link 192 mounted at its lower end on a fixed pivot 193. Intermediate its ends the link 192 has carried thereby a roller 194 which engages a cam 195 mounted on the shaft 93.

The arm 190 is extended above the shaft 171, as shown at 196, and the upper end of this arm is engaged by a spring 197 having its other end mounted on or connected to a bolt 198 fixed to the frame. The spring 197, therefore, functions to hold the roller 194 in engagement with cam 195.

The rollers 34 and 35 are driven in the following manner. The shaft 172 of the roller 34, which is mounted in the upper ends of the arms 169 and 170, has mounted thereon a gear 200 which meshes with a gear 201 rotatably mounted on the shaft 171, and the gear 201 in turn meshes with a gear 202 which is mounted on and driven from the shaft 103 through a clutch similar to the clutch on shaft 65 and operating in the manner shown in Fig. 10. The sprocket 102 on the shaft 103 drives one-half 203 of the clutch and the other half 204 of the clutch has projecting therefrom a pin 205 and also carries the gear 202 above mentioned. The pin 205 is adapted to be periodically engaged by the upper end of an arm 206 which is mounted on a shaft 207, which in turn is mounted in fixed bearings 208. The shaft 207 also has secured thereto an arm 209, on the upper end of which is mounted a roller 210 which is disposed in engagement with the periphery of a cam 211 mounted on the shaft 93. The engagement between the roller and the cam is maintained by a spring 212, the other end of this spring being fixed to the frame. When the cam 211 permits the arm 206 to move into the path of movement of the pin 205, the clutch 203, 204 is declutched, interrupting the drive to the gear 202 and gears 201, 200 driven thereby, and the shaft 36 of the belt roll 35 has secured thereto a gear 213, which also meshes with the gear 201 and is driven thereby.

The relative positions of the roll 34 which is mounted on a fixed axis and the roll 35 which is mounted on a movable axis, is controlled as hereinbefore described by the cam 195 (Fig. 3). However, in order to definitely determine the movement of these driving rolls toward each other to the position shown in Fig. 4, the upper end 196 of the arm 190 has projecting laterally therefrom, a stud 215 which is adapted to engage the inner end of a stop rod 216 adjustably mounted at 217 in a bracket 218 fixed to the side wall of the frame (see Fig. 3). This definite determination of the operative positions of the rolls 34 and 35, as shown in Fig. 4, is important since the paper sheet must be permitted to feed downwardly between the rolls as it is being wound into a spiral sheath by the movement of the belt.

Figure 13:
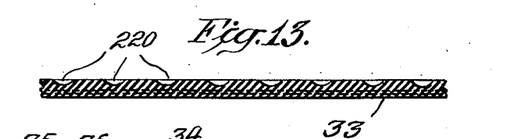
Fig. 13 is a sectional elevation through the belt which winds the paper sheath around the lead core.

The belt 33 travels constantly through a solution of suitable adhesive contained in a tank T, shown particularly in Fig. 4. In order to insure the adhesive being carried by the belt into the pocket, the outer surface of the belt has formed therein pockets 220, as shown in Fig. 13. Furthermore, in order to insure the driving of the belt, the roller 34 has formed therein radial openings 221 which increase the traction between the belt and the roller.

Figure 11:
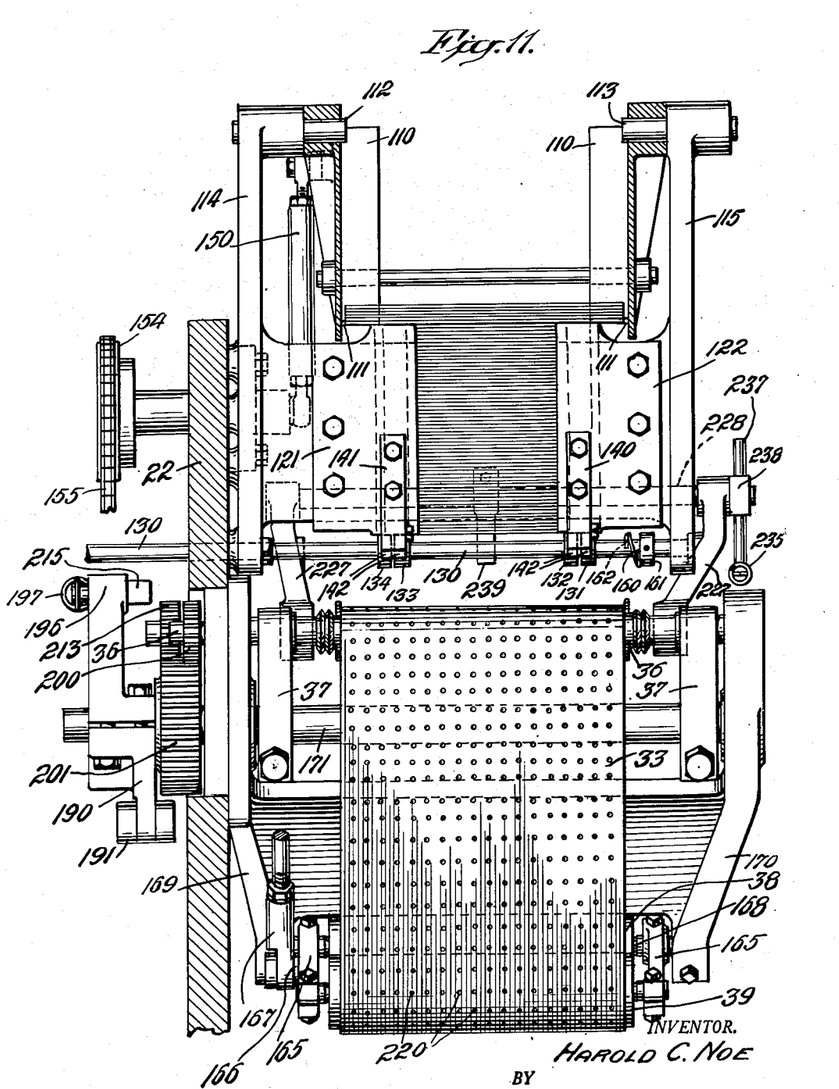
Fig. 11 is a vertical sectional elevation taken substantially on line 11—11 of Fig. 1, looking in the direction of the arrows.

The belt 33 is held in driving engagement with the rollers 34 and 35 by means of a pair of idler rollers 225 and 226. The roller 225 is carried by arms 227 which are pivoted on a shaft 228, which in turn is mounted in suitable bearings (see Fig. 5). The roller 226 is mounted in arms 230 which are fixed to a shaft 231, which in turn is pivotally mounted in suitable bearings. The rollers 225 and 226 are held in engagement with the outer surface of the belt around the rollers 34 and 35 by means of a spring 235, in the manner illustrated particularly in Figs. 1 and 4. One end of the spring 235 is connected at 236 to a post 237 carried by a block 238. This block has depending therefrom, a lug 239 which engages a rod 240, which in turn connects the arms 237. The lug 239 is secured to the shaft 228 intermediate the ends thereof, as shown particularly in Fig. 11. The other end of the spring 235 is connected at 242 to a post 243 mounted in a block 244 fixed to the shaft 231. The spring 235, therefore, tends to draw the rollers 225 and 226 toward each other and, furthermore, maintains tight engagement with the belt and firm pressure of the belt against the rollers 34 and 35 when they are in their separated positions, as shown in Fig. 5, or in the position shown in Fig. 4.

As hereinbefore stated, when the rollers 34 and 35 are in separated position, the sheet P of paper is fed to the position shown in Fig. 5, in which the advance end of the sheet P will be disposed above the portion of the belt between the rollers 34 and 35. The paper feed roller 32 is then disconnected from the drive by the action of the cam 75 and a brake is applied to insure the stopping of the feed roller. This braking action is accomplished in the following manner. The feed roll shaft 65 has mounted thereon a collar 245 which is adapted to be engaged by a brake shoe 246 (see Figs. 3 and 4), which is mounted on the end of a spring arm 247, the other end of this arm being secured at 248 to arm 190 which, in a manner hereinbefore described, controls the position of the movable belt feed roller 35. As the cam 195, through the connections hereinbefore described, moves the arm 190 to cause the belt feed roller 35 to be moved to the position shown in Fig. 5, the brake shoe 246 will be moved against the collar 245, thus insuring the stopping of rotation of the paper sheet drive roller 31 when the paper feed roller shaft 65 is declutched in the manner shown in Fig. 10.

*Pocket forming mechanism*

Figure 14:
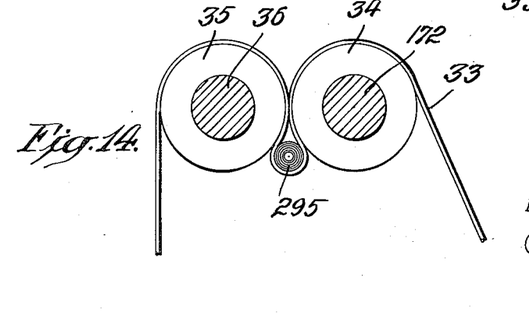
Fig. 14 is a sectional elevation through the belt guiding and feeding rollers, this view showing the belt in the position taken when the paper sheath is being formed therein.

This mechanism is illustrated in Figs. 1, 2, 3, 4 and 5. In Figs. 1, 4 and 5 the pocket former 40 is shown in elevated position prior to its downward movement to form the pocket. The pocket former consists of a rod 250 which extends transversely across the machine and above the path of movement of the sheet of paper and belt. This rod is carried by arms 251 and 252 which are secured to a shaft 253 mounted in suitable bearings at the sides of the machine. The shaft 253 is pivotally mounted and has connected thereto an arm 254, to the upper end of which is connected a link 255, the other end of the link being connected at 256 to a vertically extending arm 257 which is pivoted at its lower end at 258 on a fixed pivot. Intermediate its ends the arm 257 has mounted thereon a roller 260 which engages a cam 261 mounted on a shaft 77. The arm 254 extends upwardly beyond its pivotal connection to the link 255 and a spring 262 is connected to the upper end of the arm and to a fixed bracket 263 (see Fig. 3). The spring 262 holds the roller 260 in engagement with the cam 261. As the cam is rotated by the shaft 77, the pocket former 40, including the rod 250, will be moved downwardly at the proper period in the cycle of operation of the machine to engage the sheet of paper which has been fed to the position shown in Fig. 5, thereby forcing the paper downwardly against the belt 33 and forcing the belt and paper downwardly between the rollers 34 and 35 to form a pocket therein, as shown in Figs. 4 and 14.

*Pencil ejector mechanism*

This mechanism is illustrated particularly in Figs. 2, 5 and 9. After the paper has been wound around the lead core into a tight sheath, the belt feed rollers 34 and 35 are moved from the position shown in Fig. 4 to the position shown in Fig. 5, and the pencil formed within the pocket is lifted thereby and the movement of the belt causes the pencil to move to the left, viewing Fig. 5. The pressure roll 226 is preferably formed in the manner shown in Fig. 2, namely, with a plurality of spaced collars or flanges 264 thereon. A rod 265, which is mounted in the side frames of the machine, is disposed parallel to the axes of the belt feed rollers and has secured thereto, in spaced relation thereon, a pair of blocks 266 and 267, these blocks having fingers 268 and 269 which extend between two sets of adjacent flanges or collars 264 on the roller 226. The pencil which is raised on the belt will roll onto the fingers and into the V-shaped notch 270 formed at the junction of the fingers and the blocks.

Figure 12:
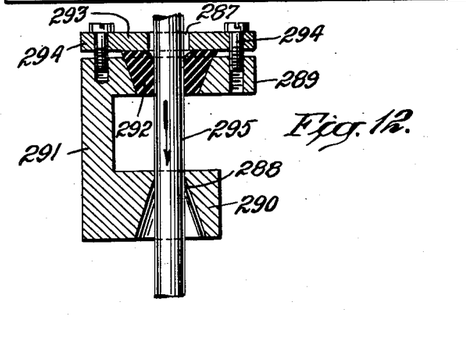
Fig. 12 is an enlarged sectional elevation illustrating wiping and guiding means through which the completed pencil is discharged from the machine.

The pencil so formed and disposed in the notch is ejected therefrom by the ejecting mechanism illustrated more particularly in Figs. 2 and 9. Shaft 77 has mounted thereon a grooved cam 271 in which is positioned a roller 272 carried by an arm 273 mounted on a fixed pivot 274. The upper end of the arm 273 is connected by a link 275, preferably adjustable as to length, to an arm 276 mounted on a shaft 277. The shaft 277 has also secured thereto, at the upper end thereof, viewing Fig. 9, an arm 278. At the other end of the arm 278 is secured a pin 279 which is pivotally mounted in a socket 280 formed in a block 281 slidably mounted on guide rods 282. Block 281 has a downwardly extending lug 283 to which is secured a rod 284 which is disposed parallel to the guide rods 282. On the other end of the rod 284 there is mounted an arm 285 having projecting laterally therefrom and parallel to the rod 282, an ejector rod 286. The rod 286, as shown particularly in Figs. 4, 5 and 8, is disposed in the notch 270 or in a position to engage the end of the pencil and push the pencil from the machine in the direction of the arrow shown in Fig. 2 at the bottom of the sheet. As the pencil is ejected from the machine, it is pushed through alined openings 287 and 288 in parallel arms 289 and 290 of a bracket 291 secured to the outer side of the machine, as shown in Fig. 2. The opening 287 in the arm 289, as illustrated in Fig. 12, is conical and has a conical packing 292, the outer end of which is engaged by a plate 293 carried by the arm 289. As the screws 294 which connect the plate to the arm are screwed inwardly, the packing 292 will be forced inwardly in the conical opening 287 to reduce the size of the opening through the packing. This packing is preferably of flexible material, such as rubber, and the purpose of the packing is to remove the glue or adhesive from the outer surface of the pencil 295 as the pencil is forced out of the machine.

The pocket former cam is so designed as to force the paper and belt downwardly to form a pocket at the proper period in the sequence of operation of the machine and the ejector control cam 271 is so designed as to operate the ejector mechanism after the pencil has been formed and has been raised by the belt and delivered to the notch formed at the base of the fingers 268 and 269.

In addition to the automatically operating clutches above described, a manually controlled clutch is provided for disconnecting the drive to the shaft 77. This clutch and clutch control is shown particularly in Fig. 2. The clutch is interposed between the gear 97 and the shaft 77. The gear 97, as shown in Fig. 2, has one-half 300 of the clutch connected thereto and the other half 301 of this clutch is keyed to the shaft 77. In order to operate the clutch, an arm 302, carried by a shaft 303, is provided with a clutch yoke 304 of the usual construction, which is adapted to move the clutch members 300 and 301 into and out of operation with relation to each other. The shaft 303 has also connected thereto an arm 305 having a handle 306 at one end by means of which the clutch is operated. This manually operable clutch, as above described, disconnects the drive from the shaft 77 and thereby stops the paper feed, lead feed and pocket former and ejector operation.

*Summary of operation*

The cycle of operation of the method and machine hereinbefore described may be briefly summarized as follows. The paper sheet P is fed by the paper feed rollers 30 and 31 to the position shown in Fig. 5. At this stage in the operation of the machine, the belt rollers 34 and 35 are moved to separated position or, in other words, the movable roller 35 is moved by the cam 195 to a position spaced from the roller 34, as shown in Fig. 5, and the travel of the belt is stopped.

As the feed roller 31 is being operated to feed the paper, the brake 246 (Fig. 3) is applied to stop the rotation of the feed roller as soon as the paper reaches the correct position in its forward feeding movement, and the feed roller 31 is declutched from the drive shaft in the manner shown in Fig. 10, by arms 70 and 73 and cam 75. The movement of the brake is controlled by the movement of the belt roller 35.

Thereupon the pocket former rod 250 controlled by cam 261 (Figs. 3 and 4) is moved downwardly and depresses the advance end of the paper sheet P and the belt 33 between the rollers 34 and 35 to the position shown in Fig. 4, thus forming a pocket. The pocket former is then withdrawn from the pocket and a lead is fed by the lead feed rollers 131 to 134 into the pocket and upon the upper surface of the end of the sheet of paper which is disposed in the pocket on the belt. Thereupon the feed rollers 34 and 35 move to the position shown in Figs. 4 and 14, the belt travel is resumed, and the paper sheet will be drawn into the pocket and wound around the lead core. Since the belt 33 runs through a bath of suitable glue or adhesive, the successive convolutions of the paper sheet as it is wound into a sheath will be secured together.

As soon as the winding operation is completed, the cam 195 (Fig. 3) will move the roller 35 away from the roller 34 and the pencil formed during the winding operation will be lifted and will be fed by the motion of the belt onto the fingers 268 and 269 into the notch 270. Thereupon the ejector mechanism will come into operation and by the action of the cam 271 will cause the ejector rod 286 to force the pencil through the bracket 291, during which operation the packing 292 will wipe excess glue or adhesive from the outer surface of the pencil.

During the operation above described, the belt tension and guide roller 39 is raised to provide slack in the belt when the rollers 34 and 35 are separated and a pocket is to be formed therein by the pocket former. The movement of the roller 39 is controlled by the action of the cam 183 in the manner shown in Fig. 8.

From the foregoing specification it will be clear that the machine and method described operate efficiently to wind a paper sheet around a lead core and secure the successive convolutions together. Furthermore, the operation can be carried out by travel of the belt in one direction and no reversal of the belt is necessary, as in prior machines.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A sheath forming machine comprising an endless belt, means including a pair of rollers for supporting and driving said belt, means for feeding a sheet of paper to a predetermined position with relation to said belt, roller control means for changing the relative position of said rollers toward or away from each other, means engageable with one end portion of the sheet for forming said sheet end and belt between said belt supporting means into a pocket between said rollers, means for discharging a core into said pocket, and means for moving the belt supporting and driving rollers toward each other and means for driving the belt, thereby rolling the paper around the core.

2. A sheath forming machine comprising an endless belt, a bath of adhesive material, means including a pair of rollers for supporting and driving said belt through said bath, means for feeding a sheet of paper to a predetermined position with relation to said belt, roller control means for changing the relative position of said rollers toward or away from each other, means engageable with one end of the sheet for forming said sheet end and belt between said belt supporting means into a pocket between said rollers, means for discharging a core into said pocket, and means for moving the belt supporting and driving rollers toward each other and means for driving the belt, thereby rolling the paper around the core continuously in one direction.

3. A sheath forming machine comprising an endless belt, means including a pair of rollers for supporting and driving said belt, means for feeding a sheet of paper to a predetermined position with relation to said belt, roller control means for changing the relative position of said rollers toward or away from each other, means for disconnecting the belt drive, means engageable with the advance end of the sheet for forming said sheet end and belt between said belt supporting means into a pocket between said rollers, means for discharging a core into said pocket, means for moving the belt supporting and driving rollers toward each other and means for driving the belt, thereby rolling the paper around the core, and means for operating said roller control means to separate the belt supporting and driving rollers after the winding operation is completed to stretch the belt across said rollers and lift the sheath out of the pocket and discharge the sheath from the belt.

4. A pencil forming machine comprising an endless belt, a bath of adhesive material, means including a pair of rollers for supporting and driving said belt through said bath, means for feeding a sheet of paper to a predetermined position with the advance end of the paper above said belt, roller control means for changing the relative position of said rollers toward or away from each other, means engageable with one end of the sheet for pressing said sheet end and belt between said belt supporting means to form a pocket between said rollers, means for depositing a lead core into said pocket, means for moving the belt supporting and driving rollers toward each other, means for driving the belt, thereby rolling the paper around the lead core, means for operating said roller control means to separate the belt supporting and driving rollers after the winding operation is completed to stretch the belt across said rollers and lift the pencil out of the pocket and discharge the pencil from the belt, means for receiving and supporting the pencil discharged from the belt, and means for engaging and discharging said pencil so supported from the machine.

5. A pencil forming machine comprising an endless belt, a bath of adhesive material, means including a pair of rollers for supporting and driving said belt through said bath, means for feeding a sheet of paper to a predetermined, juxtaposed position with relation to said belt, roller control means for changing the relative position of said rollers toward or away from each other, means engageable with one end of the sheet for pressing said sheet end and belt between said belt supporting means to form a pocket between said rollers, means for depositing a lead core into said pocket, means for moving the belt supporting and driving rollers toward each other, means for driving the belt, thereby rolling the paper around the lead core, means for operating said roller control means to separate the belt supporting and driving rollers after the winding operation is completed to stretch the belt across said rollers and lift the pencil out of the pocket and discharge the pencil from the belt, means for receiving and supporting the pencil discharged from the belt, means for engaging and discharging said pencil so supported from the machine, and means engageable with the pencil as it is discharged from the machine for removing adhesive from the pencil.

6. A pencil forming machine comprising a pair of belt supporting and driving rollers, means for controlling the spacing of said rollers toward and away from each other, an endless belt supported on and driven by said rollers, means for driving said rollers in one direction, idler means engaging another portion of said belt for holding the belt at the desired tension on said first named rollers, means for feeding a sheet of paper to a juxtaposed position with relation to said belt, means for moving said idler means toward said pair of rollers to slacken the belt, means for operating said roller spacing control means to separate the pair of rollers, means engageable with an end of the paper sheet for pressing said sheet end and the belt between the separated rollers to form a pocket, and means for depositing a lead into said pocket, said roller control means operating thereafter to move the belt rollers toward each other, whereupon the movement of the belt will draw the sheet into the pocket and wind the sheet around the core, said roller control means thereafter moving the pair of rollers to separated position, thereby lifting the pencil and discharging the pencil from the belt.

7. A pencil forming machine comprising an endless belt, a bath of adhesive material, means including a pair of rollers for supporting and driving said belt through said bath, means for holding the belt constantly against said rollers, means for feeding a sheet of paper to a predetermined position with one end of the paper juxtaposed with relation to said belt, roller control means for changing the relative position of said rollers toward or away from each other, means engageable with the advance end of the sheet for pressing said sheet end and belt between said belt supporting means to form a pocket between said rollers, means for depositing a lead core into said pocket, and means for moving the belt supporting and driving rollers toward each other and for driving the belt, thereby rolling the paper around the lead core.

8. A pencil forming machine comprising an endless belt, means including a pair of rollers for supporting and driving said belt having a coating of adhesive thereon, means for feeding a sheet of paper to a predetermined, juxtaposed position with relation to said belt, roller control means for changing the relative position of said rollers toward or away from each other, means engageable with one end of the sheet for pressing said sheet end and belt between said belt supporting means to form a pocket between said rollers, means for depositing a lead core into said pocket, and means for moving the belt supporting and driving rollers toward each other and for driving the belt, thereby rolling the paper around the lead core.

9. A pencil forming machine comprising an endless belt, means including a pair of rollers for supporting and driving said belt, means for feeding a sheet of paper to a predetermined, juxtaposed position of one end of the paper relative to said belt, roller control means for changing the relative position of said rollers toward or away from each other, means engageable with the said end of the sheet for pressing said sheet end and belt between said belt supporting means to form a pocket between said rollers, means for depositing a lead core into said pocket, and means for moving the belt supporting and driving rollers toward each other and for driving the belt, thereby rolling the paper around the lead core, said belt having pockets therein for receiving and carrying adhesive material.

10. A pencil forming machine comprising an endless belt, means including a pair of rollers for supporting and driving said belt, means for feeding a sheet of paper to a predetermined, juxtaposed position of one end of the paper relative to said belt, roller control means for changing the relative position of said rollers toward or away from each other, means engageable with the said end of the sheet for pressing said sheet end and belt between said belt supporting means to form a pocket between said rollers, means for depositing a lead core into said pocket, means for moving the belt supporting and driving rollers toward each other and for driving the belt, thereby rolling the paper around the lead core, said belt having pockets therein for receiving and carrying adhesive material, a brake for the paper feeding means, means operable when the said rollers are moved to separated position for applying the brake to said paper feeding means, and means for disconnecting said paper feeding means when the paper has reached said predetermined position with relation to said belt.

11. A pencil forming machine comprising an endless belt, a bath of adhesive material, means including a pair of rollers for supporting and driving said belt through said bath, means for feeding a sheet of paper to a predetermined position with the advance end of the paper above said belt, roller control means for changing the relative position of said rollers toward or away from each other, means engageable with the advance end of the sheet for pressing said sheet end and belt between said belt supporting means to form a pocket between said rollers, means for feeding a lead core into said pocket, and means for moving the belt supporting and driving rollers toward each other and for driving the belt, thereby rolling the paper around the lead core, said belt having pockets therein for receiving and carrying adhesive material.

HAROLD C. NOE.

REFERENCES CITED

The following references are of record in the file of this patent:

UNITED STATES PATENTS

| Number | Name | Date |
| --- | --- | --- |
| 1,018,114 | Kern | Feb. 20, 1912 |
| 1,831,062 | Frederick | Nov. 10, 1931 |
| 2,259,959 | Miller | Oct. 21, 1941 |